(12) United States Patent
Chen

(10) Patent No.: US 9,775,330 B1
(45) Date of Patent: Oct. 3, 2017

(54) AQUAPONIC SYSTEM

(71) Applicant: Chun-Ku Chen, Taichnug (TW)

(72) Inventor: Chun-Ku Chen, Taichnug (TW)

( * ) Notice: Subject to any disclaimer, the term of this patent is extended or adjusted under 35 U.S.C. 154(b) by 0 days.

(21) Appl. No.: 15/615,863

(22) Filed: Jun. 7, 2017

(51) Int. Cl.
| | | |
|---|---|---|
| *A01K 63/00* | (2017.01) | |
| *A01G 31/00* | (2006.01) | |
| *A01G 31/02* | (2006.01) | |
| *A01K 63/04* | (2006.01) | |
| *C02F 103/20* | (2006.01) | |
| *C02F 3/32* | (2006.01) | |

(52) U.S. Cl.
CPC ............ *A01K 63/003* (2013.01); *A01G 31/02* (2013.01); *A01K 63/045* (2013.01); *A01G 31/00* (2013.01); *C02F 3/32* (2013.01); *C02F 2103/20* (2013.01)

(58) Field of Classification Search
CPC .... A01K 63/003; A01K 63/04; A01K 63/045; A01K 63/006; Y02P 60/216; Y02P 60/642; A01G 31/00; C02F 1/006; C02F 3/06; C02F 3/105; C02F 3/327
USPC .................................. 119/248, 227; 47/62 R
See application file for complete search history.

(56) References Cited

U.S. PATENT DOCUMENTS

| | | | | |
|---|---|---|---|---|
| 8,181,391 B1 * | 5/2012 | Giacomantonio | ..... | A01G 9/025 47/59 R |
| 9,420,768 B2 * | 8/2016 | Kasner | ................. | A01K 63/003 |
| 9,426,949 B1 * | 8/2016 | Epstein | ................... | A01G 31/06 |
| 2002/0066414 A1 * | 6/2002 | Hallock | ................. | A01K 1/031 119/248 |
| 2012/0091058 A1 * | 4/2012 | Byrd | ....................... | A01K 63/04 210/610 |
| 2014/0041594 A1 * | 2/2014 | Plante | .................. | A01K 63/003 119/227 |
| 2015/0060340 A1 * | 3/2015 | Liang | .................... | A01K 63/045 210/167.22 |
| 2016/0113222 A1 * | 4/2016 | Hori | ........................ | A01K 63/04 47/59 S |
| 2016/0262322 A1 * | 9/2016 | Lee | ......................... | A01G 31/02 |
| 2017/0105393 A1 * | 4/2017 | Plante | .................. | A01K 63/006 |

* cited by examiner

Primary Examiner — Yvonne Abbott-Lewis
(74) Attorney, Agent, or Firm — Alan D. Kamrath; Kamrath IP Lawfirm, P.A.

(57) ABSTRACT

An aquaponic system includes a frame, an aquarium located at a lower portion of the frame and provided with a motor, a plurality of cultivating tanks arranged on the frame and having two opposite sides provided with a plurality of inlet tanks and a plurality of outlet tanks, and a strainer unit mounted on the frame. Each of the outlet tanks is connected with a lower one of the inlet tanks. The strainer unit includes a water outlet port connected with the water inlet pipe, a water inlet port connected with a water feeding pipe, two hollow clamping plates located between the water outlet port and the water inlet port, a filtering sponge clamped between the two clamping plates, a fertilizer ferment chamber located under the water inlet port, and a drain pipe connected with the fertilizer ferment chamber.

13 Claims, 22 Drawing Sheets

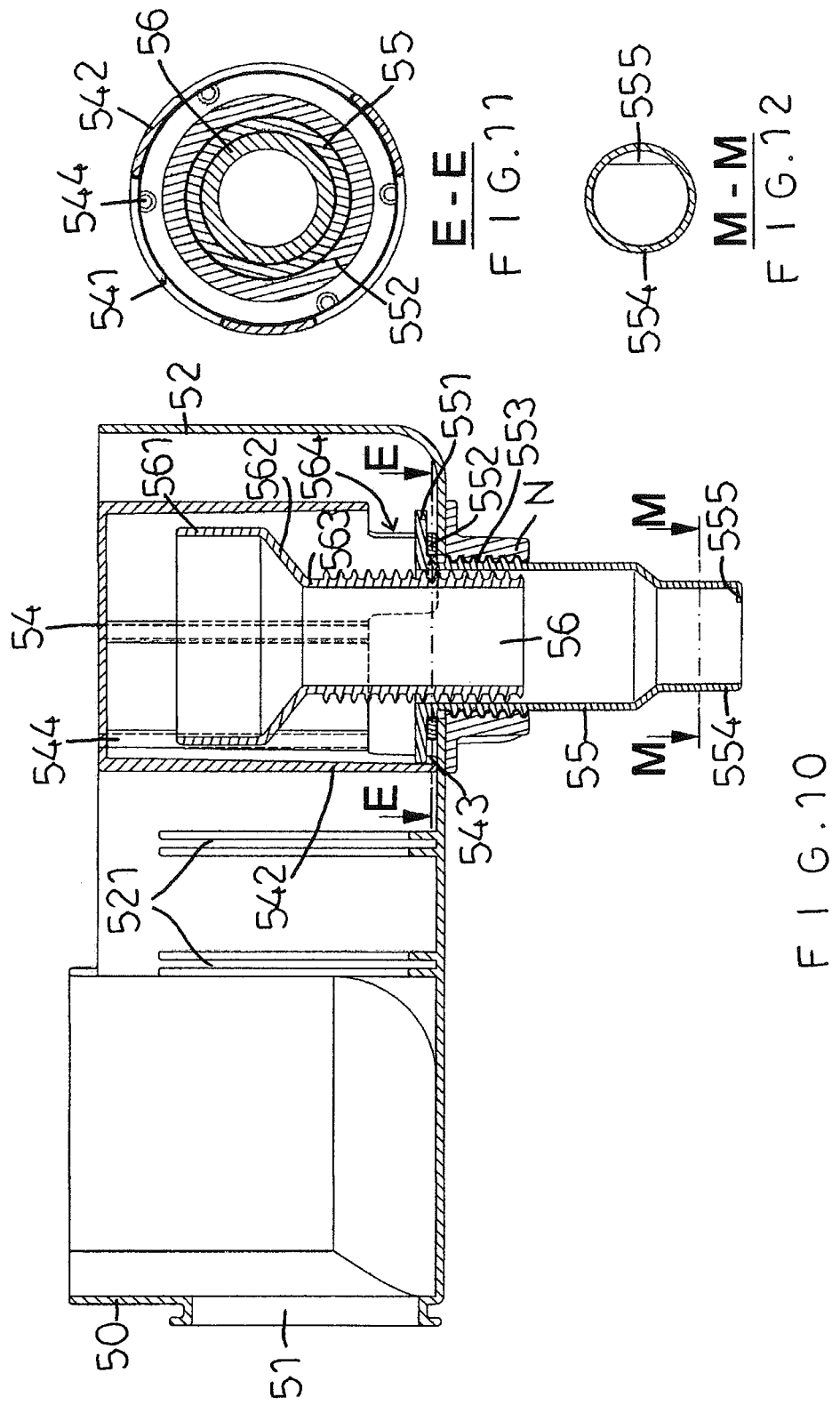

E-E

US 9,775,330 B1

AQUAPONIC SYSTEM

BACKGROUND OF THE INVENTION

1. Field of the Invention

The present invention relates to a fish and plant symbiotic system and, more particularly, to an aquaponic system that combines the aquaculture and the hydroponics.

2. Description of the Related Art

A conventional aquaponic system comprises a frame, an aquarium mounted on the frame, and a plurality of cultivating tanks arranged on the frame. The aquarium is provided with a pump to pump the water and the fish excrement in the aquarium to the cultivating tanks. Each of the cultivating tanks is provided with a siphon to deliver the water in each of the cultivating tanks to the aquarium. However, the fish excrement and feedstuff remains of the aquarium are not fermented so that the plant cannot directly absorb the nutrient of the fish excrement and feedstuff remains. In addition, the root of the plant easily blocks the water flow path in each of the cultivating tanks, so that the fish excrement and feedstuff remains cannot flow with the water smoothly and are easily jammed with the root of the plant, and the root of the plant will becomes black and cannot grow healthily. Further, the height of the siphon cannot be adjusted when overflow happens, so that the siphon cannot correspond to different water levels required by different roots of the plant. Further, the siphon needs to connect a bent tube to produce a vacuum pulling force, thereby wasting the material and space. Further, the size of the frame is fixed and cannot be adjusted according to the practical requirement, so that the conventional aquaponic system is not available for places of different sizes.

BRIEF SUMMARY OF THE INVENTION

In accordance with the present invention, there is provided an aquaponic system comprising a frame, an aquarium located at a lower portion of the frame and having an interior provided with a motor, a plurality of cultivating tanks arranged on the frame and having two opposite sides provided with a plurality of inlet tanks and a plurality of outlet tanks, and a strainer unit mounted on the frame. Each of the inlet tanks is provided with a water inlet seat. The water inlet seat of the uppermost one of the inlet tanks is connected with a water inlet pipe. Each of the outlet tanks is connected with a lower one of the inlet tanks. Each of the outlet tanks is provided with a water outlet seat which is provided with a water outlet tube. The water outlet tube of the lowermost one of the outlet tanks is connected to the aquarium. The strainer unit includes a water outlet port connected with the water inlet pipe, a water inlet port connected with a water feeding pipe which is connected with the motor of the aquarium, two hollow clamping plates located between the water outlet port and the water inlet port, a filtering sponge clamped between the two clamping plates, a fertilizer ferment chamber located under the water inlet port, and a drain pipe connected with the fertilizer ferment chamber. The water inlet port is located at a position lower than that of the water outlet port.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 10 is a cross-sectional view of the outlet tank of the aquaponic system as shown in FIG. 8.

FIG. 11 is a cross-sectional view of the outlet tank of the aquaponic system taken along line E-E as shown in FIG. 10.

FIG. 12 is a cross-sectional view of the outlet tank of the aquaponic system taken along line M-M as shown in FIG. 10.

DETAILED DESCRIPTION OF THE INVENTION

Figure 1:
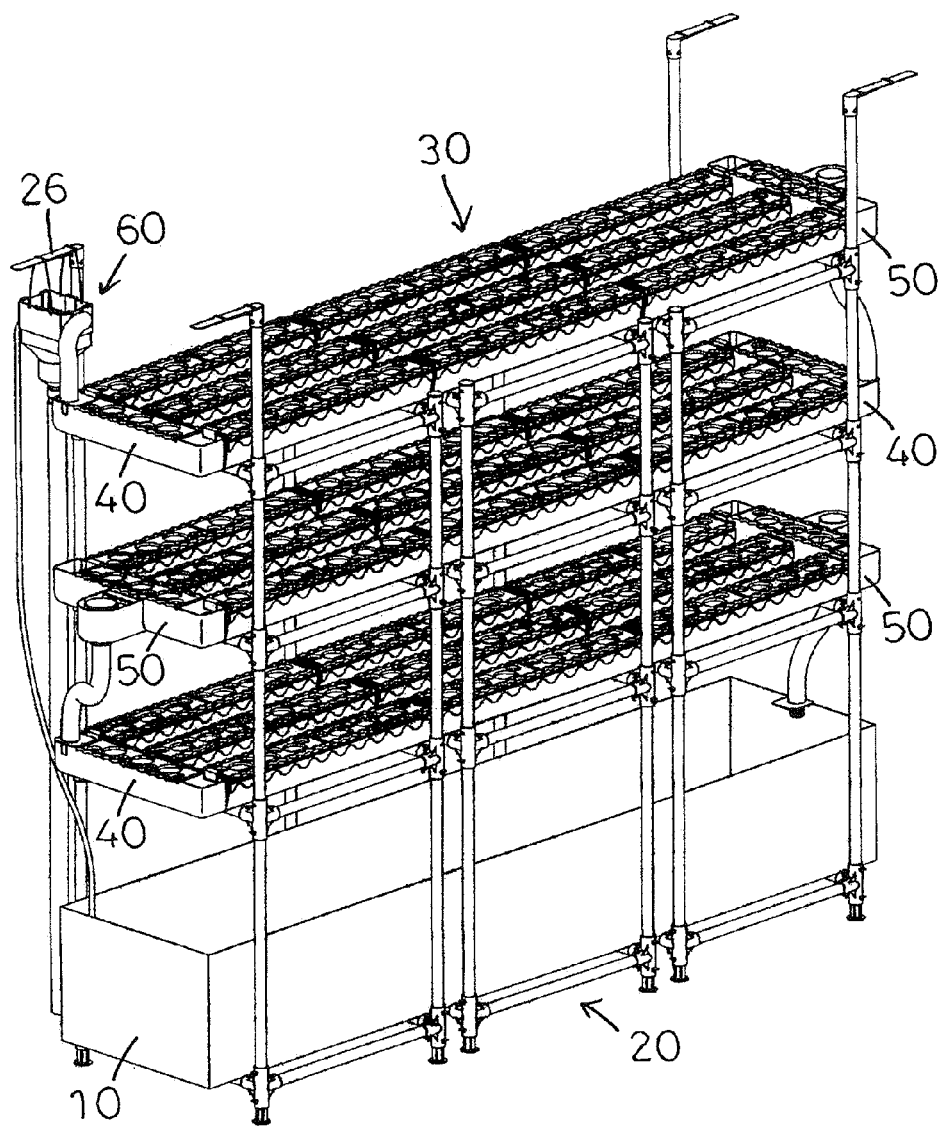
FIG. 1 is a perspective view of an aquaponic system in accordance with the preferred embodiment of the present invention.

Referring to the drawings and initially to FIGS. 1-17, an aquaponic system in accordance with the preferred embodiment of the present invention comprises an aquarium 10, a frame 20, a plurality of cultivating tanks 30, a plurality of inlet tanks 40, a plurality of outlet tanks 50, a strainer unit 60 and a plurality of illuminating devices 70.

Figure 16:
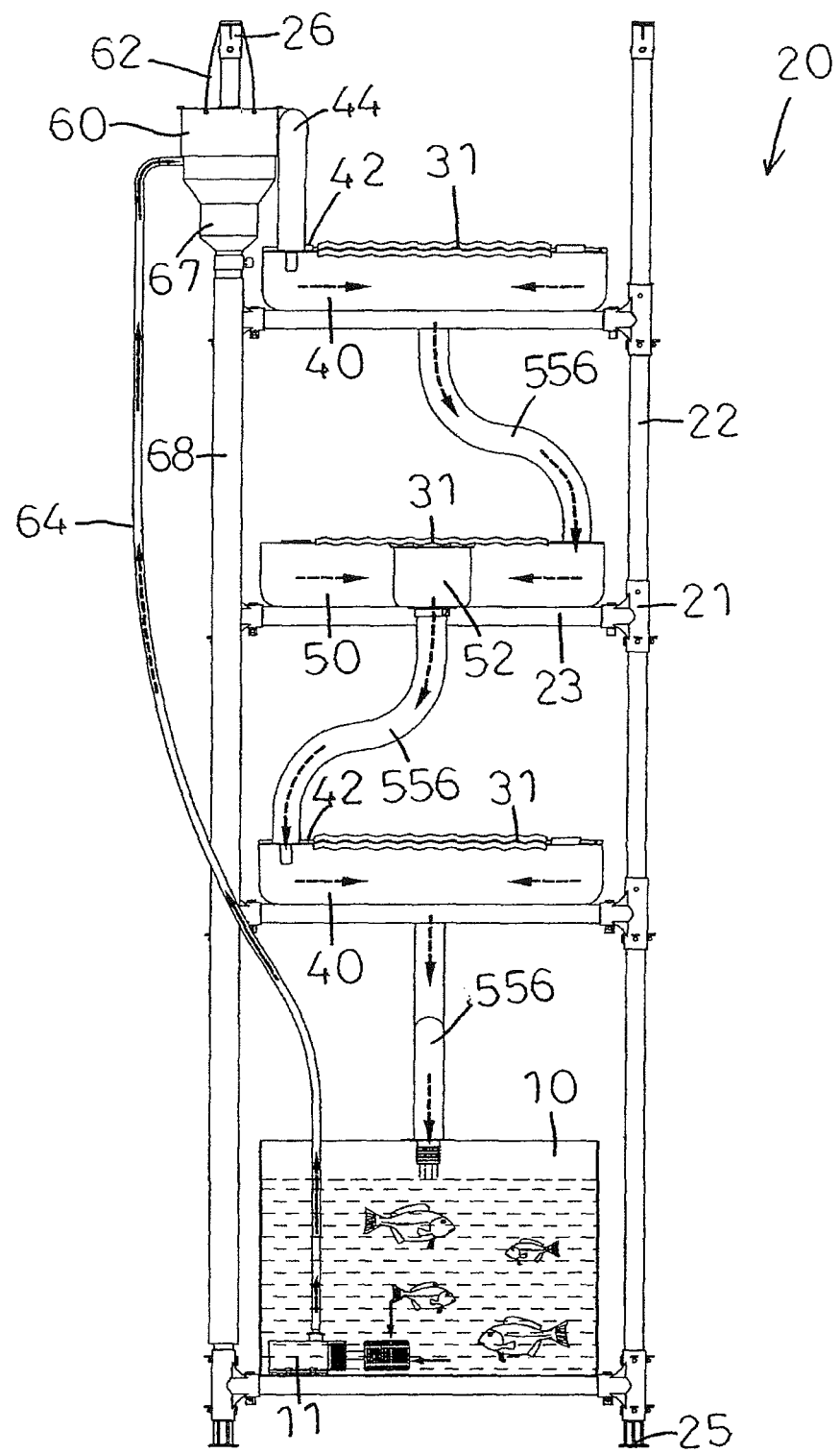
FIG. 16 is a schematic side operational view of the aquaponic system as shown in FIG. 1 in use.

The aquarium 10 is located at a lower portion of the frame 20 and has an interior provided with a motor 11 (see FIG. 16).

Figure 2:
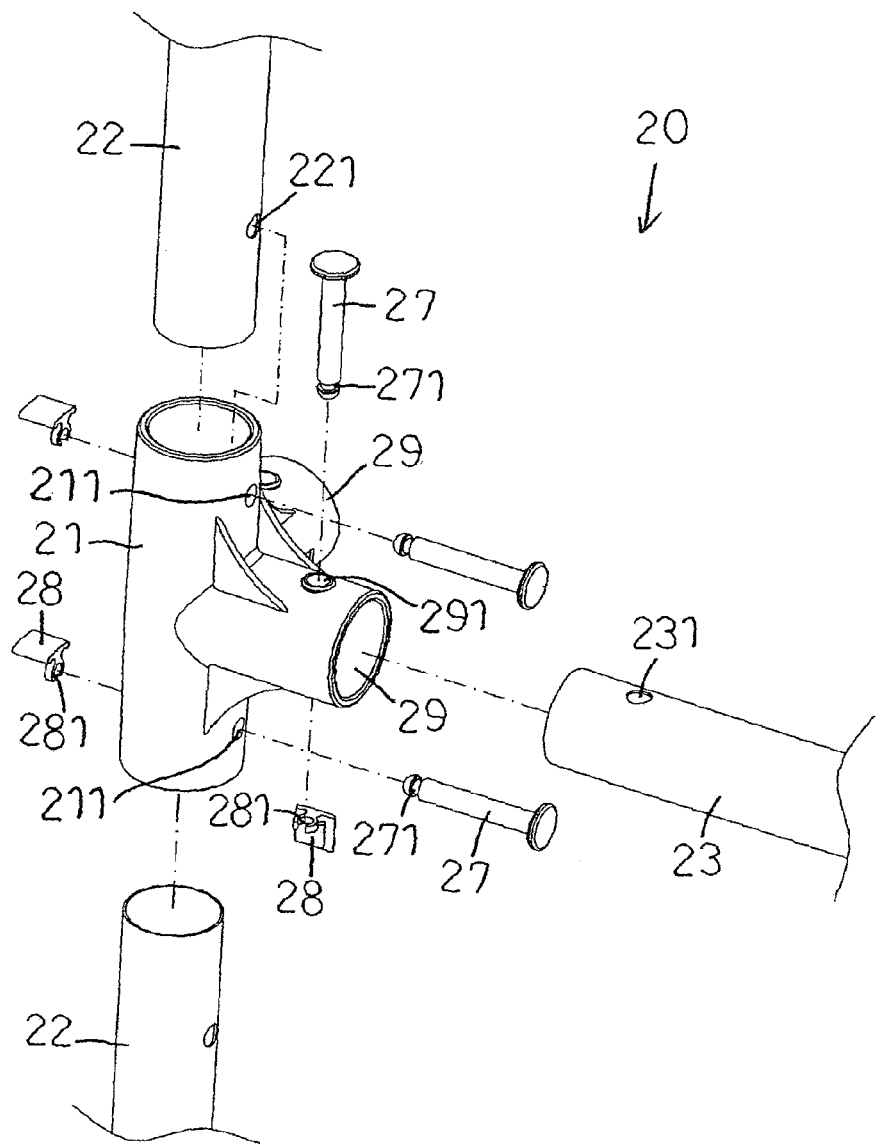
FIG. 2 is a partially exploded perspective view of a frame of the aquaponic system as shown in FIG. 1.
Figure 3:
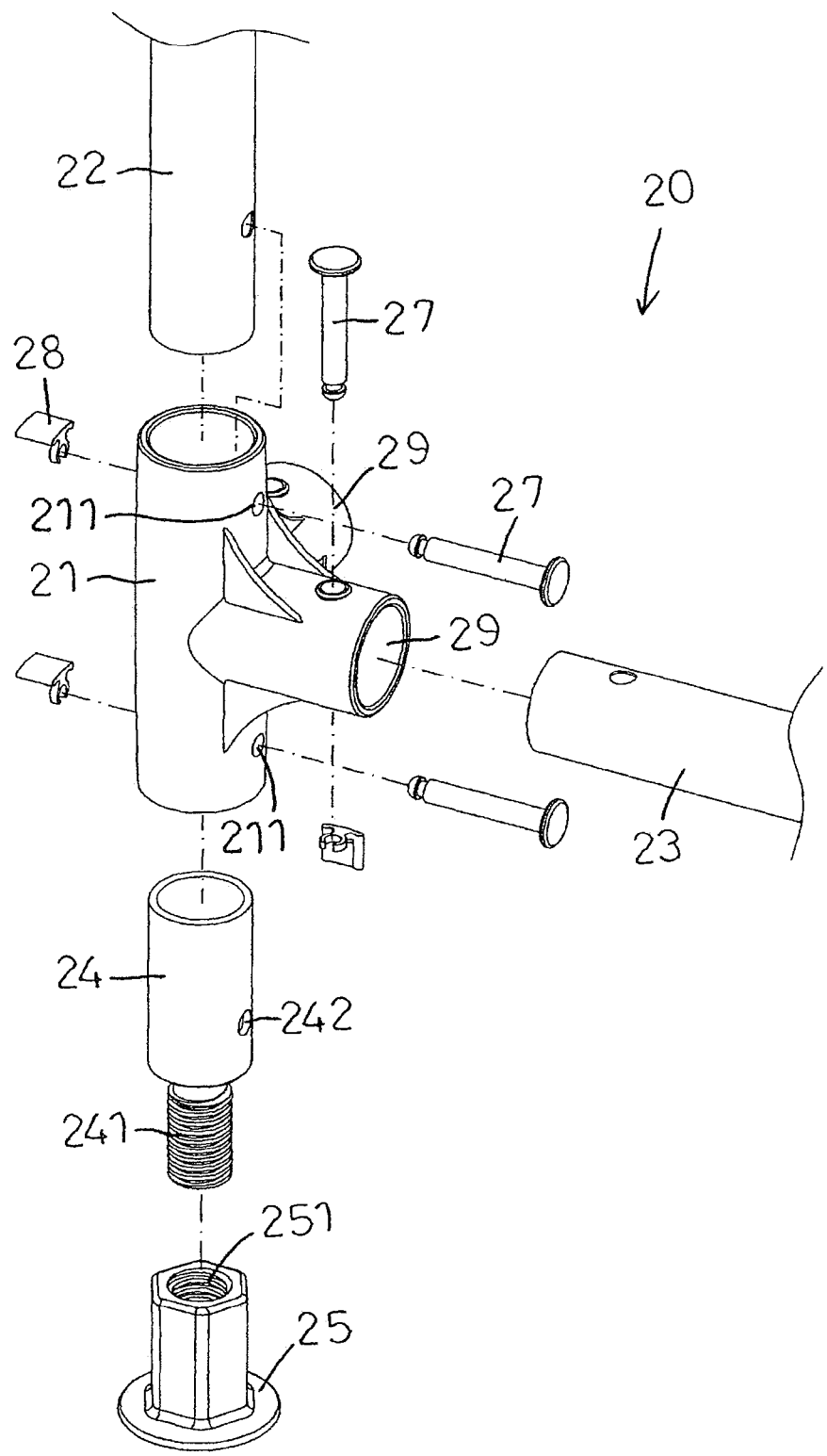
FIG. 3 is a partially exploded perspective view of the frame of the aquaponic system as shown in FIG. 1.

As best shown in FIGS. 2 and 3, the frame 20 includes a plurality of connectors 21, a plurality of upright tubes 22, a plurality of transverse tubes 23, a plurality of adjusting tubes 24, a plurality of stands 25, a plurality of hanging brackets 26, a plurality of pins 27 and a plurality of fasteners 28. Each of the connectors 21 is hollow and allows insertion of two of the upright tubes 22. Each of the connectors 21 is provided with two mounting sleeves 29 allowing insertion of two of the transverse tubes 23. The two mounting sleeves 29 are perpendicular to each other. The lowermost one of the connectors 21 has a lower end connected with one of the adjusting tubes 24. Each of the adjusting tubes 24 has a lower end provided with an external thread 241. Each of the stands 25 has an upper end provided with an internal thread 251 screwed onto the external thread 241 of one of the adjusting tubes 24, so that each of the stands 25 is moved relative to one of the adjusting tubes 24 by rotation to adjust the distance between each of the stands 25 and one of the adjusting tubes 24. The uppermost one of the connectors 21 has an upper end connected with one of the hanging brackets 26. Each of the connectors 21, each of the mounting sleeves 29, each of the upright tubes 22, each of the transverse tubes 23 and each of the adjusting tubes 24 is provided with an aperture 211, 291, 221, 231 and 242 allowing insertion of the pins 27 and fastened by the fasteners 28. Each of the pins 27 is provided with an annular groove 271. Each of the fasteners 28 is provided with a C-shaped snap ring 281 retained in the annular groove 271 of one of the pins 27.

Figure 18:
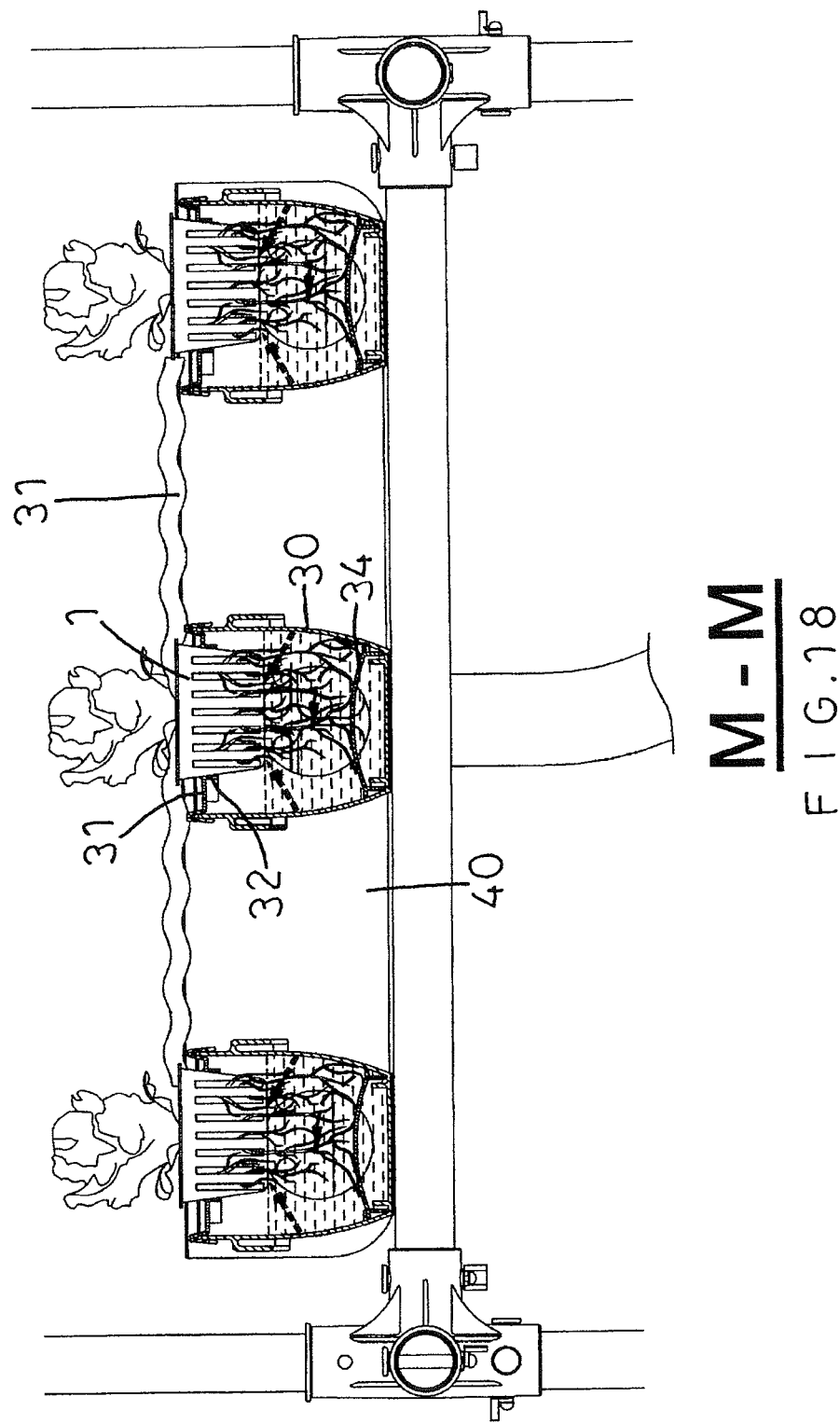
FIG. 18 is a cross-sectional view of the aquaponic system taken along line M-M as shown in FIG. 17.

As best shown in FIGS. 4-7, the cultivating tanks 30 are arranged on the frame 20 to grow the plant. Each of the cultivating tanks 30 has a bottom provided with an arcuate separation board 34 to separate and prevent the root of the plant from blocking the water flow path 342 (see FIG. 18). The arcuate separation board 34 has two sides provided with a plurality of connecting holes 341 which are arranged in a corrugated manner to allow circulation of the water so that the water freely flows forward and backward, upward and downward, and leftward and rightward. Each of the cultivating tanks 30 has a first end provided with a hollow external thread 35 and a second end provided with a through hole 36. The hollow external thread 35 of one of the cultivating tanks 30 extends through the through hole 36 of another one of the cultivating tanks 30, and a nut 37 is screwed onto the hollow external thread 35, so that the cultivating tanks 30 are connected serially.

Figure 4:
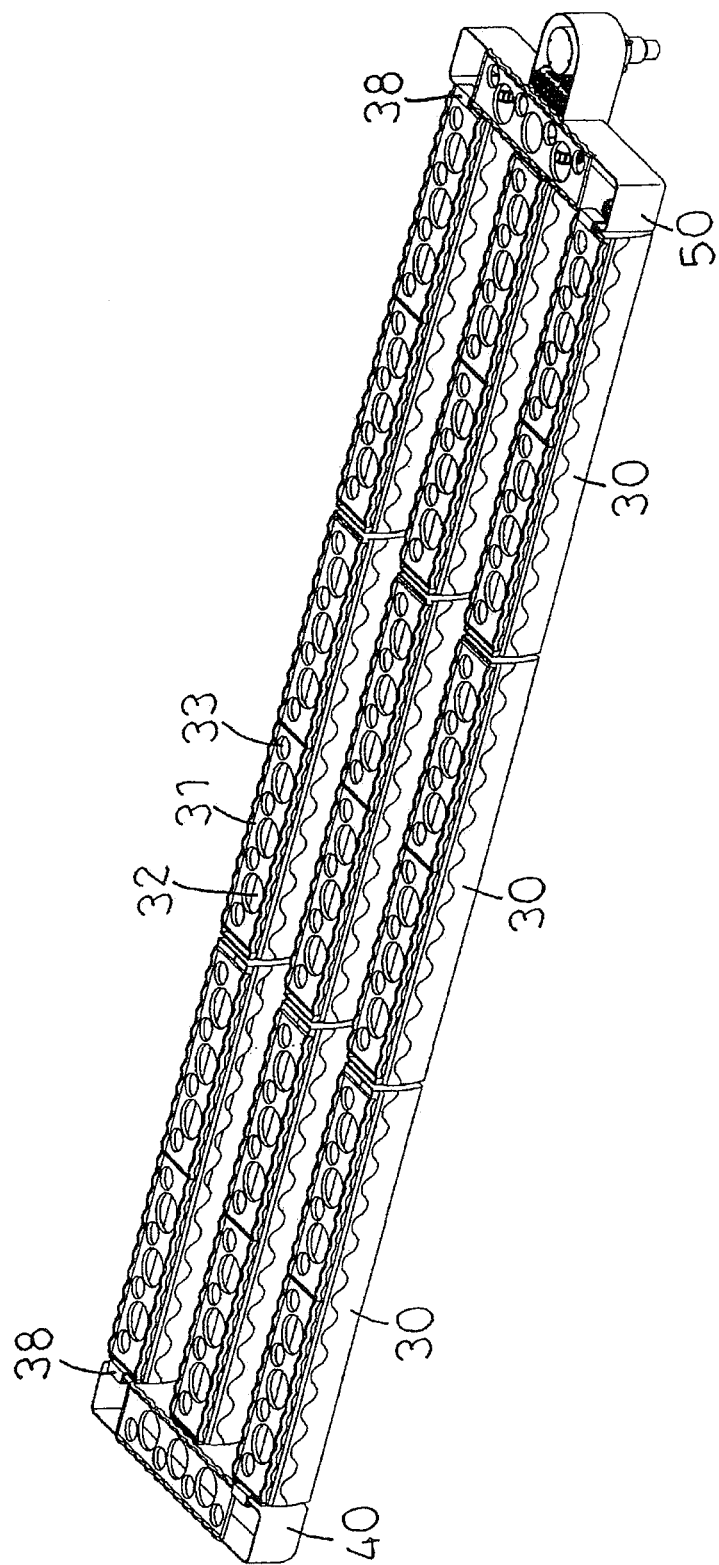
FIG. 4 is a partially perspective view of the aquaponic system as shown in FIG. 1.
Figure 5:
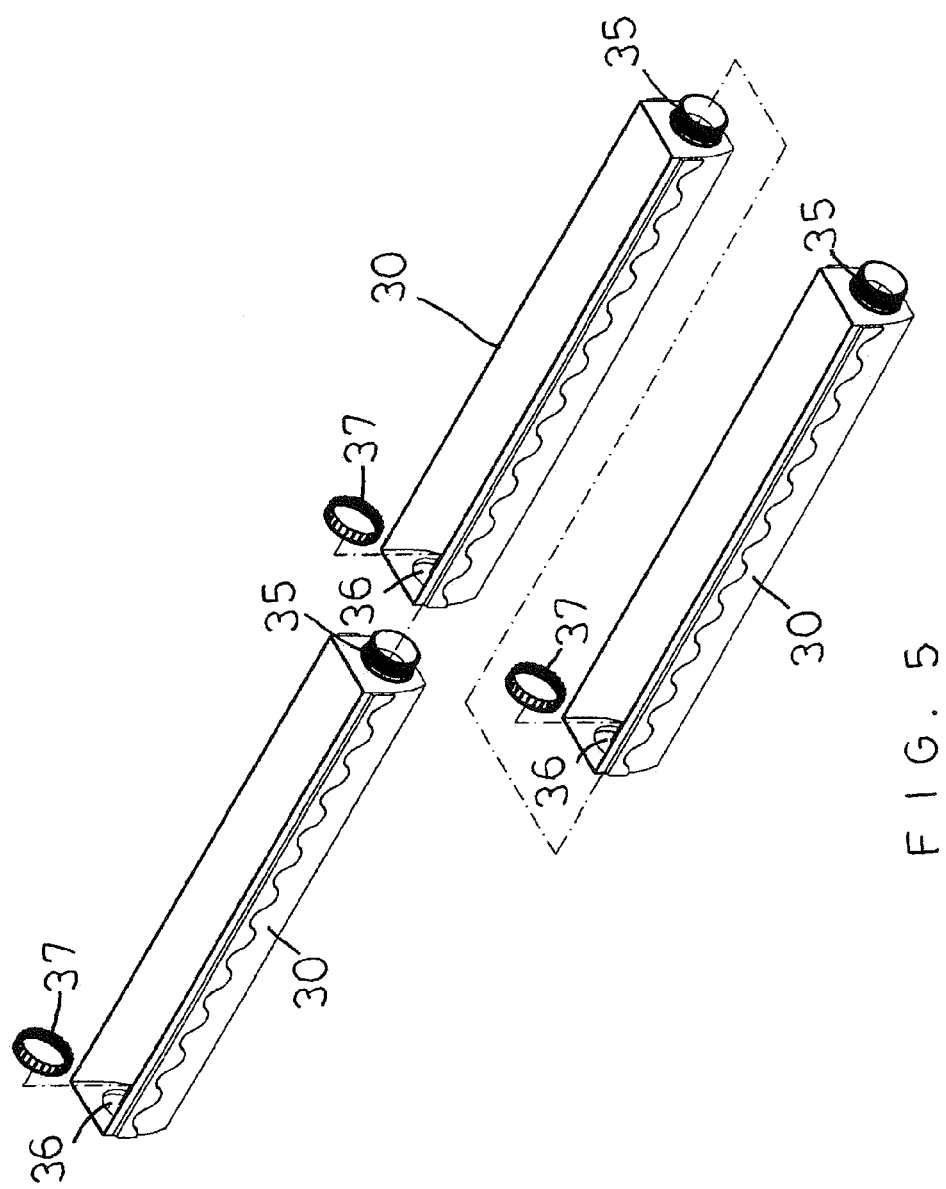
FIG. 5 is a partially exploded perspective view of the cultivating tanks of the aquaponic system in accordance with the preferred embodiment of the present invention.
Figure 6:
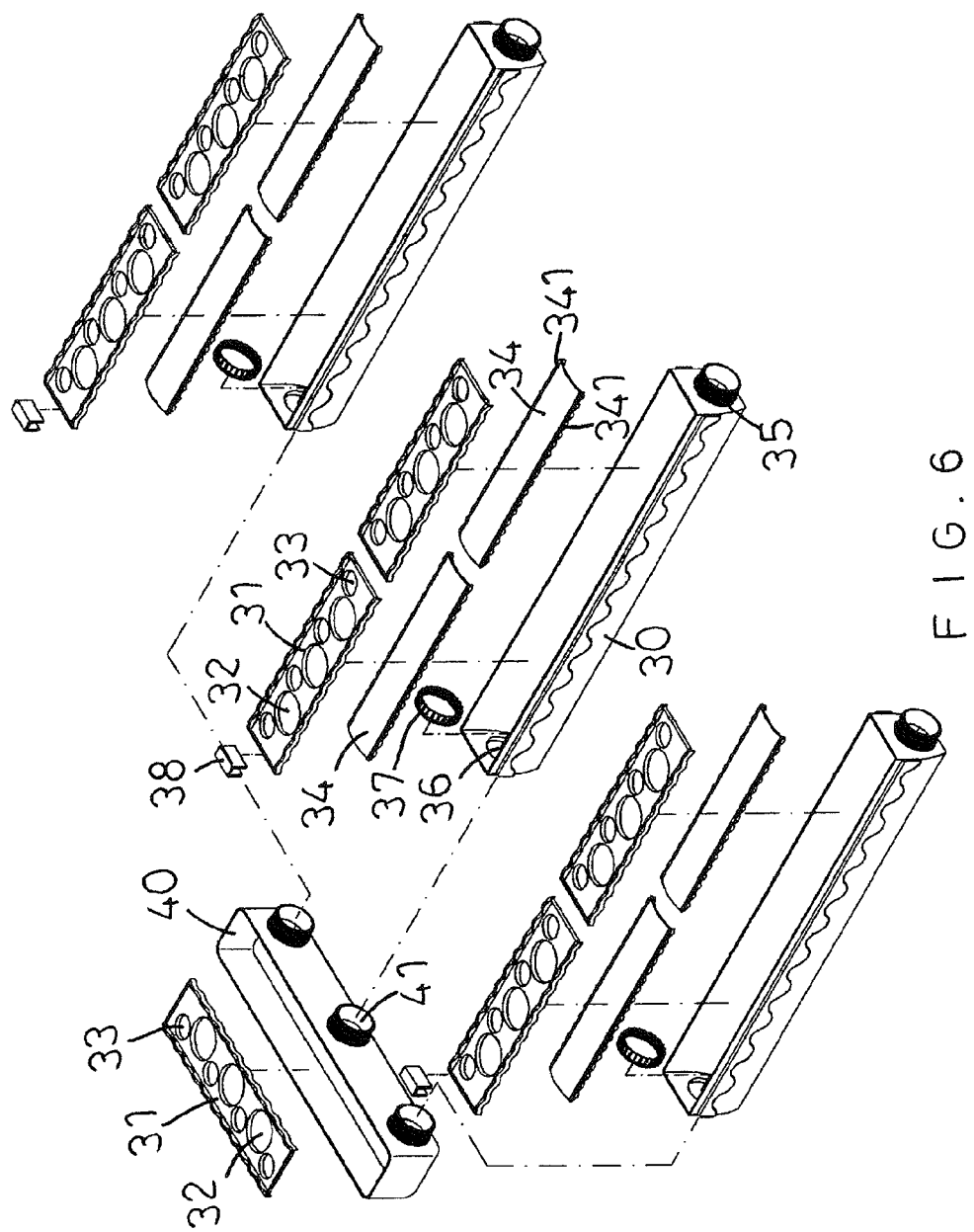
FIG. 6 is a partially exploded perspective view of the aquaponic system as shown in FIG. 4.
Figure 7:
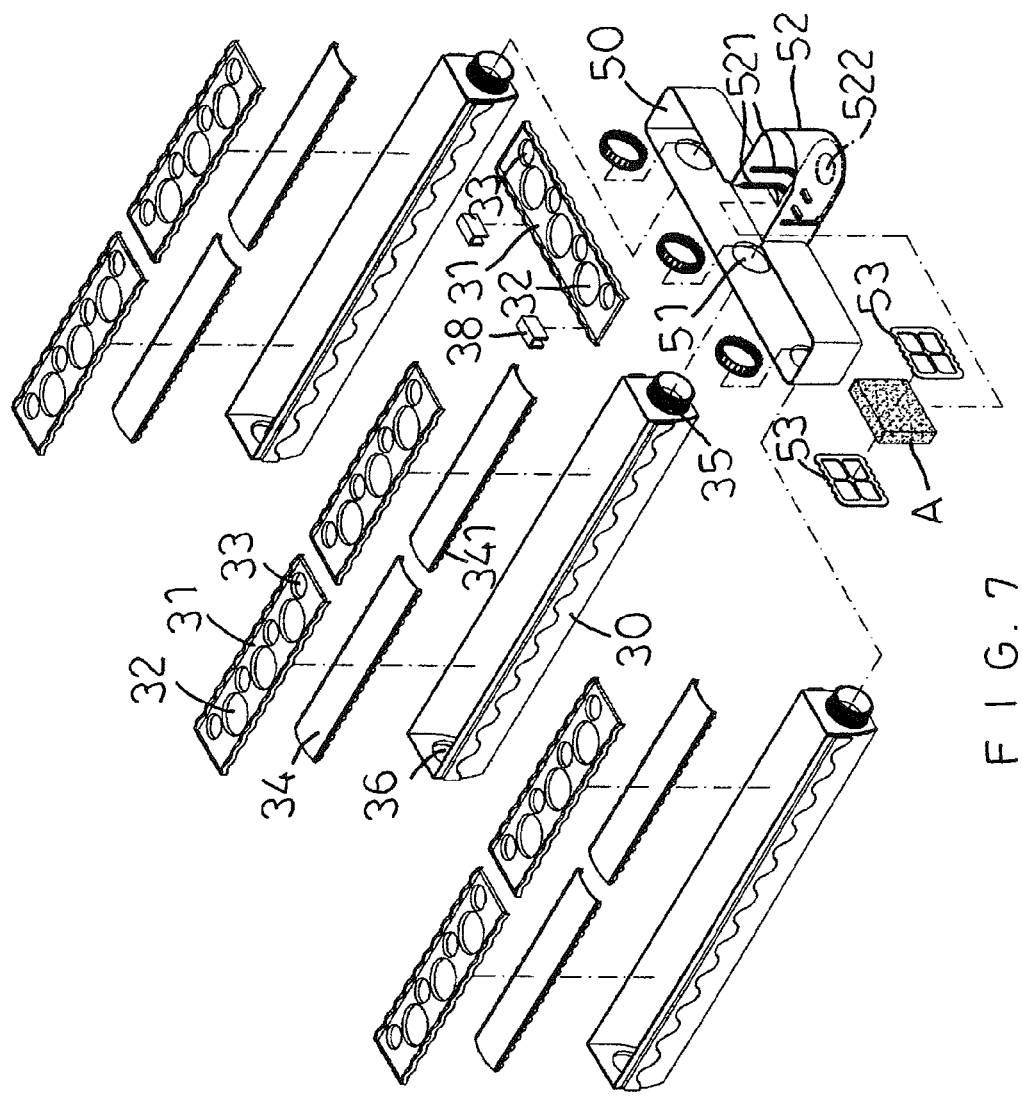
FIG. 7 is a partially exploded perspective view of the aquaponic system as shown in FIG. 4.
Figure 8:
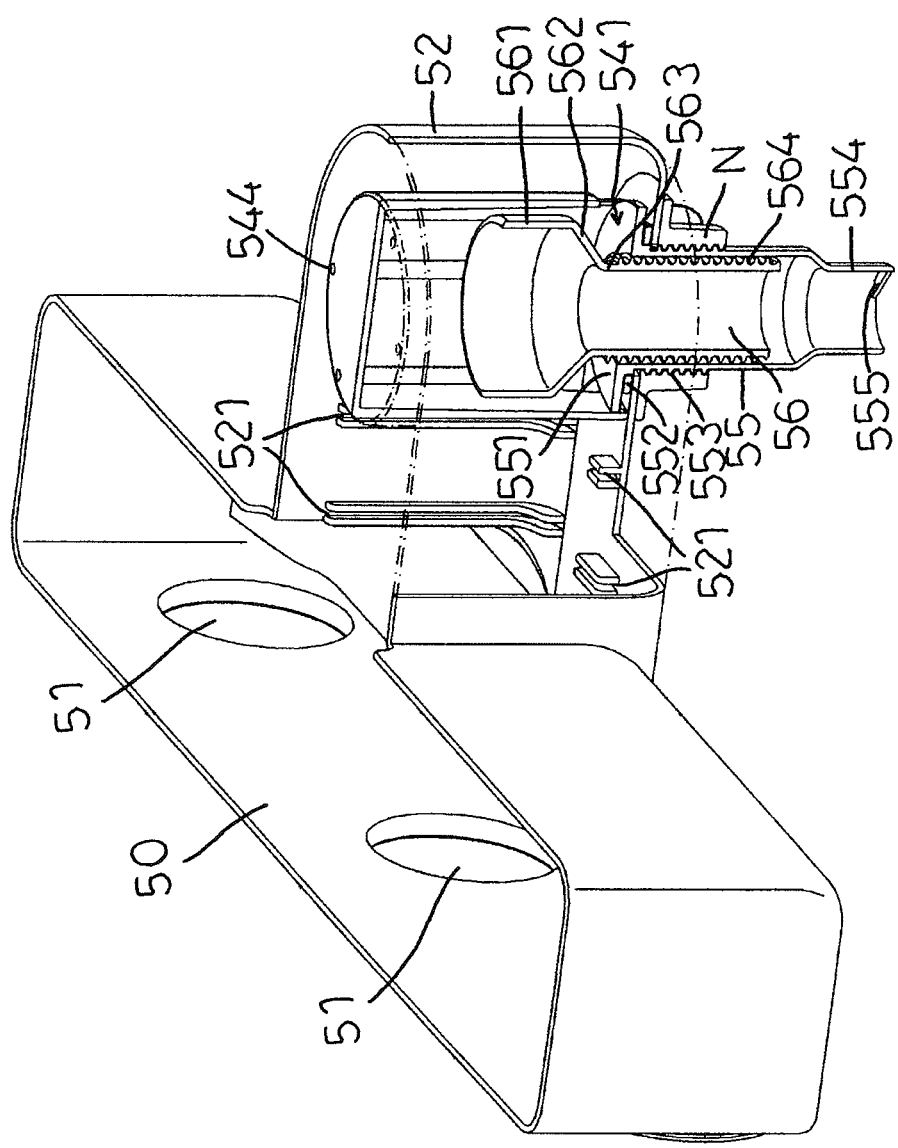
FIG. 8 is a locally enlarged perspective view of the outlet tank of the aquaponic system as shown in FIG. 4.
Figure 9:
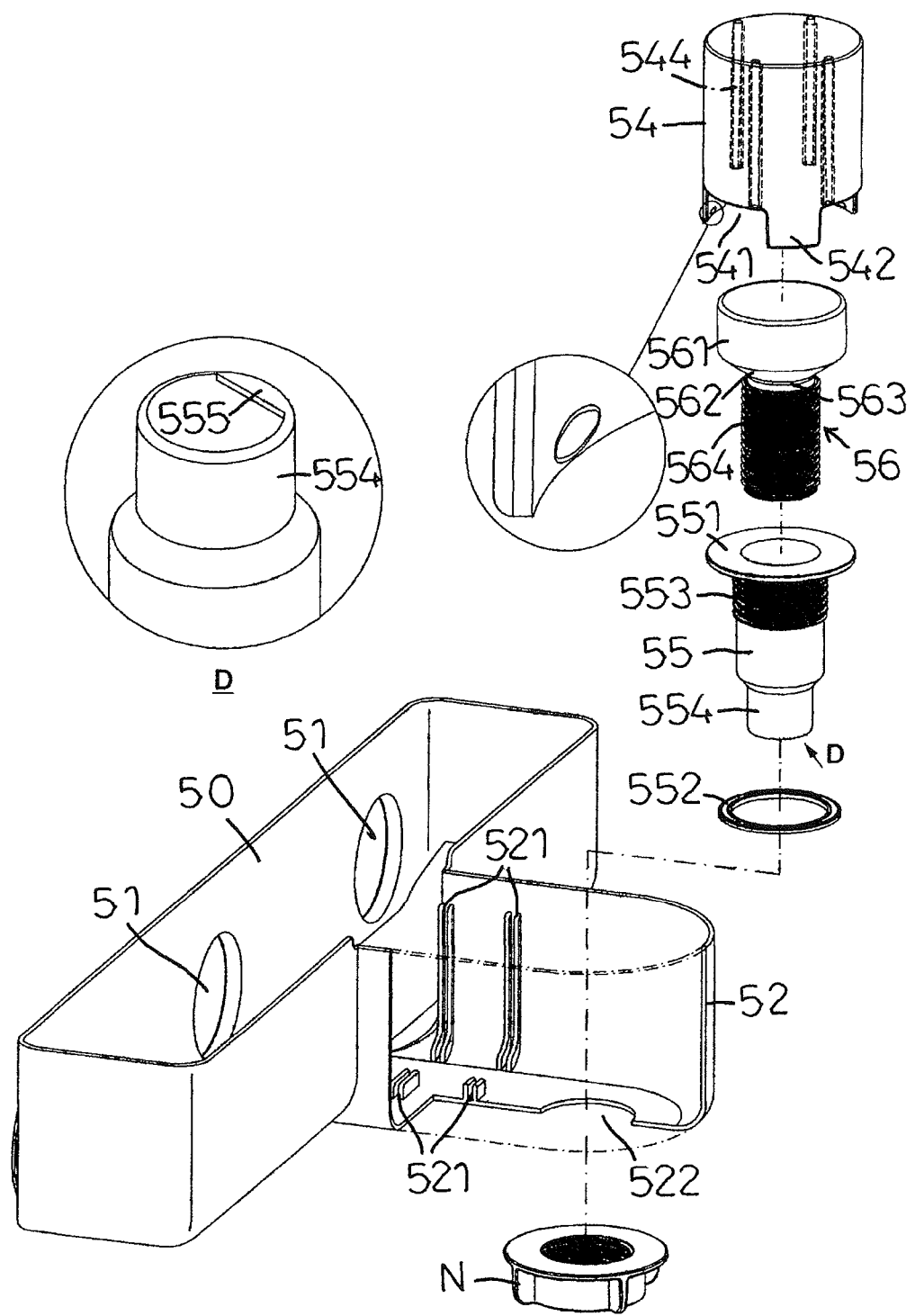
FIG. 9 is an exploded perspective view of the outlet tank of the aquaponic system as shown in FIG. 8, and a locally enlarged view taken along character "D".
Figure 21:
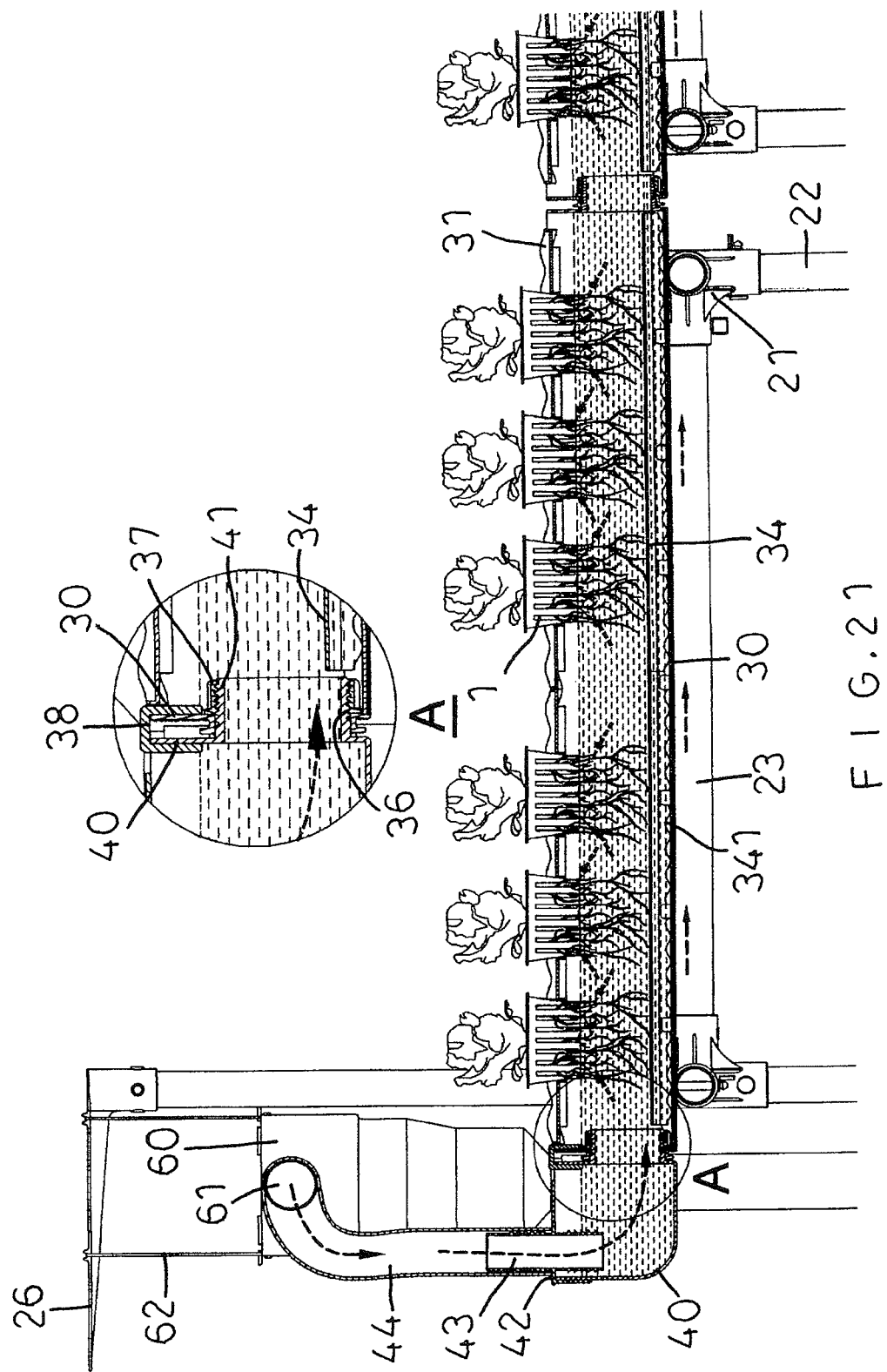
FIG. 21 is a partially front view of the aquaponic system for larger plant baskets, and a locally enlarged view taken along circle "A".

The inlet tanks 40 and the outlet tanks 50 are located at two opposite sides of the cultivating tanks 30 and are arranged in an alternating manner as shown in FIG. 1. A plurality of inverted U-shaped securing plates 38 are located between the cultivating tanks 30, the inlet tanks 40 and the outlet tanks 50 to connect and secure the cultivating tanks 30, the inlet tanks 40 and the outlet tanks 50 as shown in FIGS. 4 and 21.

Figure 19:
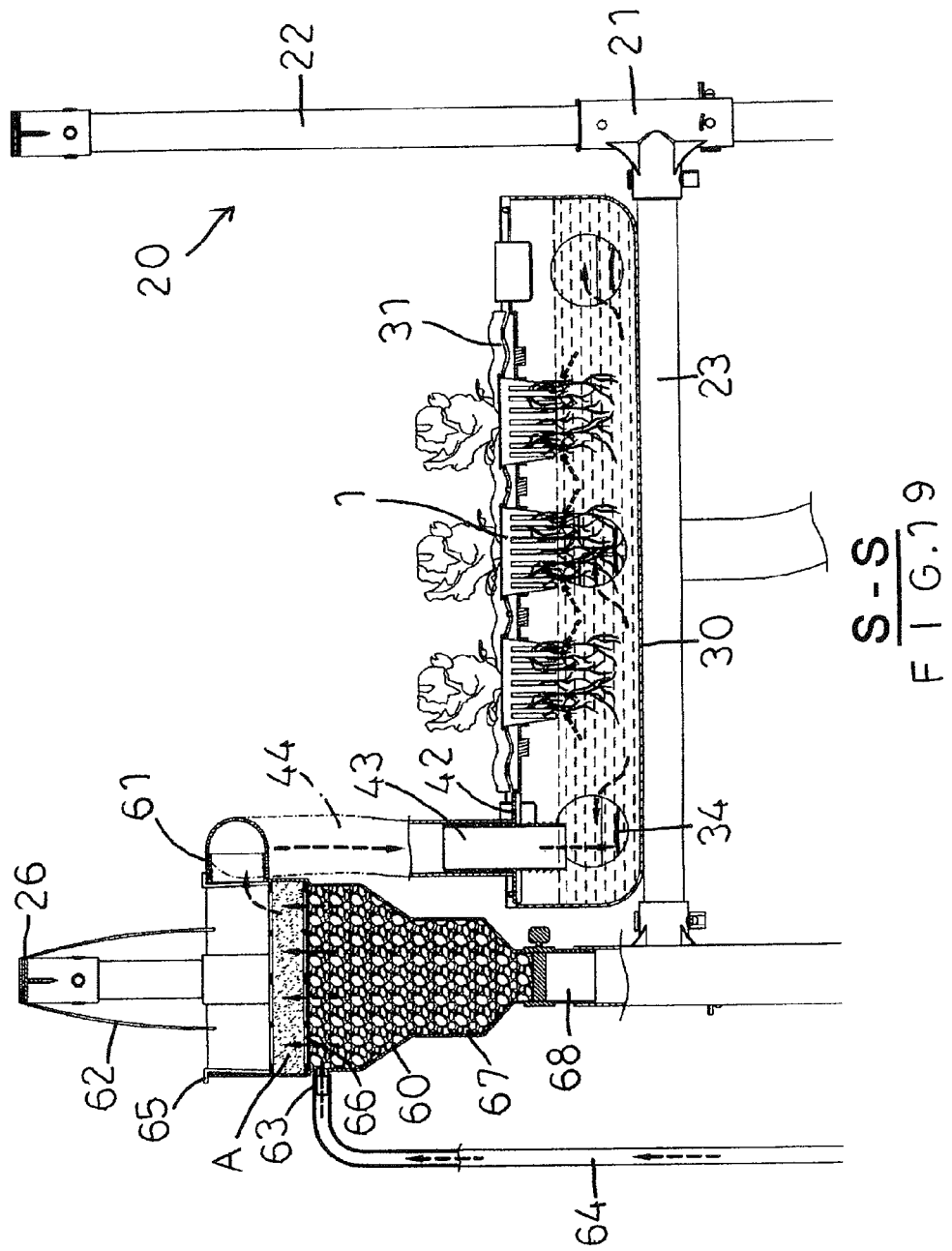
FIG. 19 is a cross-sectional view of the aquaponic system taken along line S-S as shown in FIG. 17.
Figure 20:
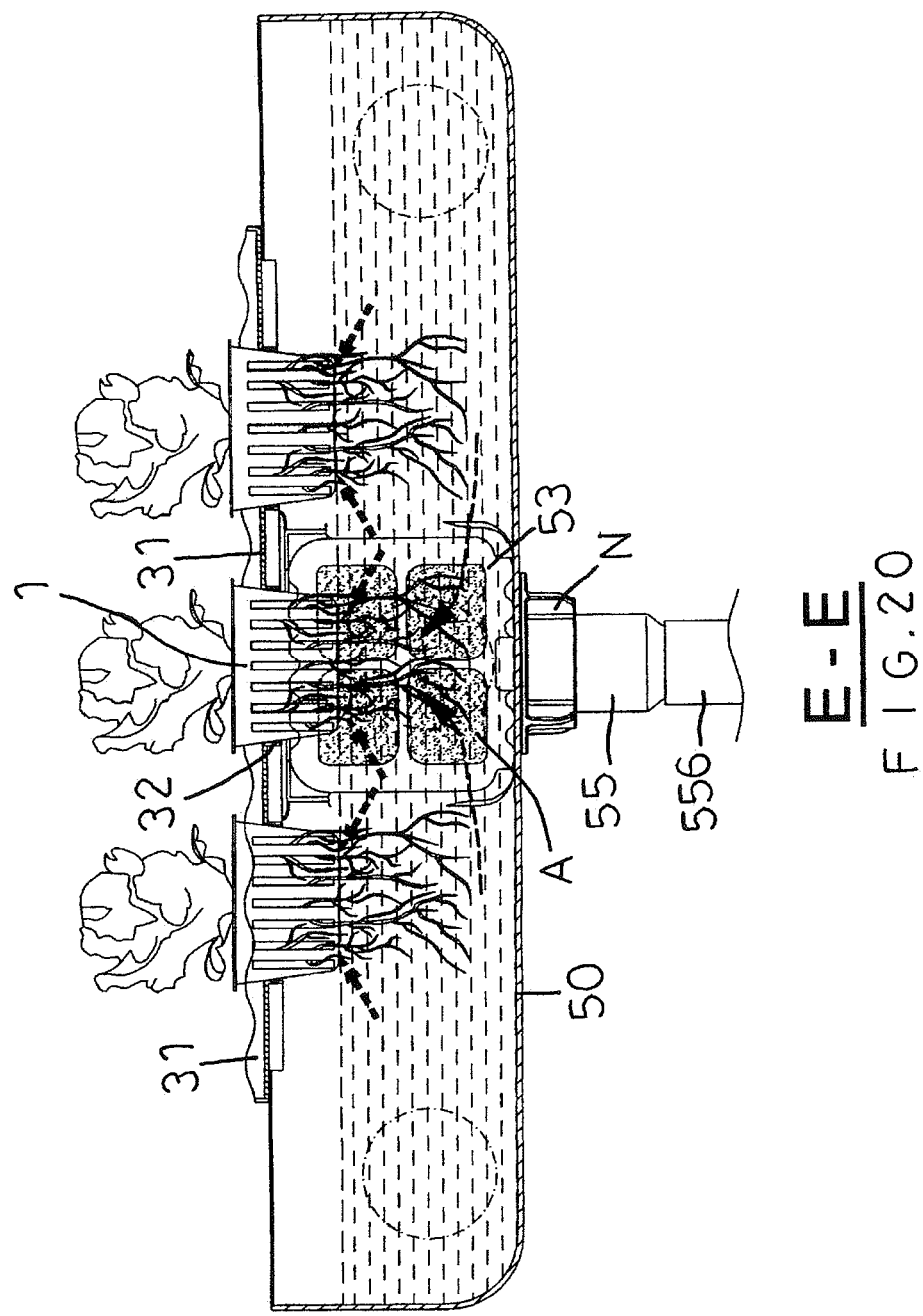
FIG. 20 is a cross-sectional view of the aquaponic system taken along line E-E as shown in FIG. 17.

The inlet tanks 40 are arranged on the left side of odd layers of the cultivating tanks 30 and the right side of even layers of the cultivating tanks 30 as shown in FIG. 1. Each of the inlet tanks 40 is provided with a plurality of hollow external threads 41 each of which extends through the through hole 36 of one of the cultivating tanks 30, and a nut 37 is screwed onto the hollow external thread 41, so that the cultivating tanks 30 and the inlet tanks 40 are combined together. As best shown in FIGS. 19 and 21, each of the inlet tanks 40 is provided with a water inlet seat 42 having a water intake port 43. The water intake port 43 of the uppermost one of the inlet tanks 40 is connected with a water inlet pipe 44.

The outlet tanks 50 are arranged on the right side of odd layers of the cultivating tanks 30 and the left side of even layers of the cultivating tanks 30 as shown in FIG. 1. Each of the outlet tanks 50 is provided with a plurality of through holes 51, the hollow external thread 35 of each of the cultivating tanks 30 extends through one of the through holes 51 of one of the cultivating tanks 30, and a nut 37 is screwed onto the hollow external thread 35, so that the cultivating tanks 30 and the outlet tanks 50 are combined together.

Figure 22:
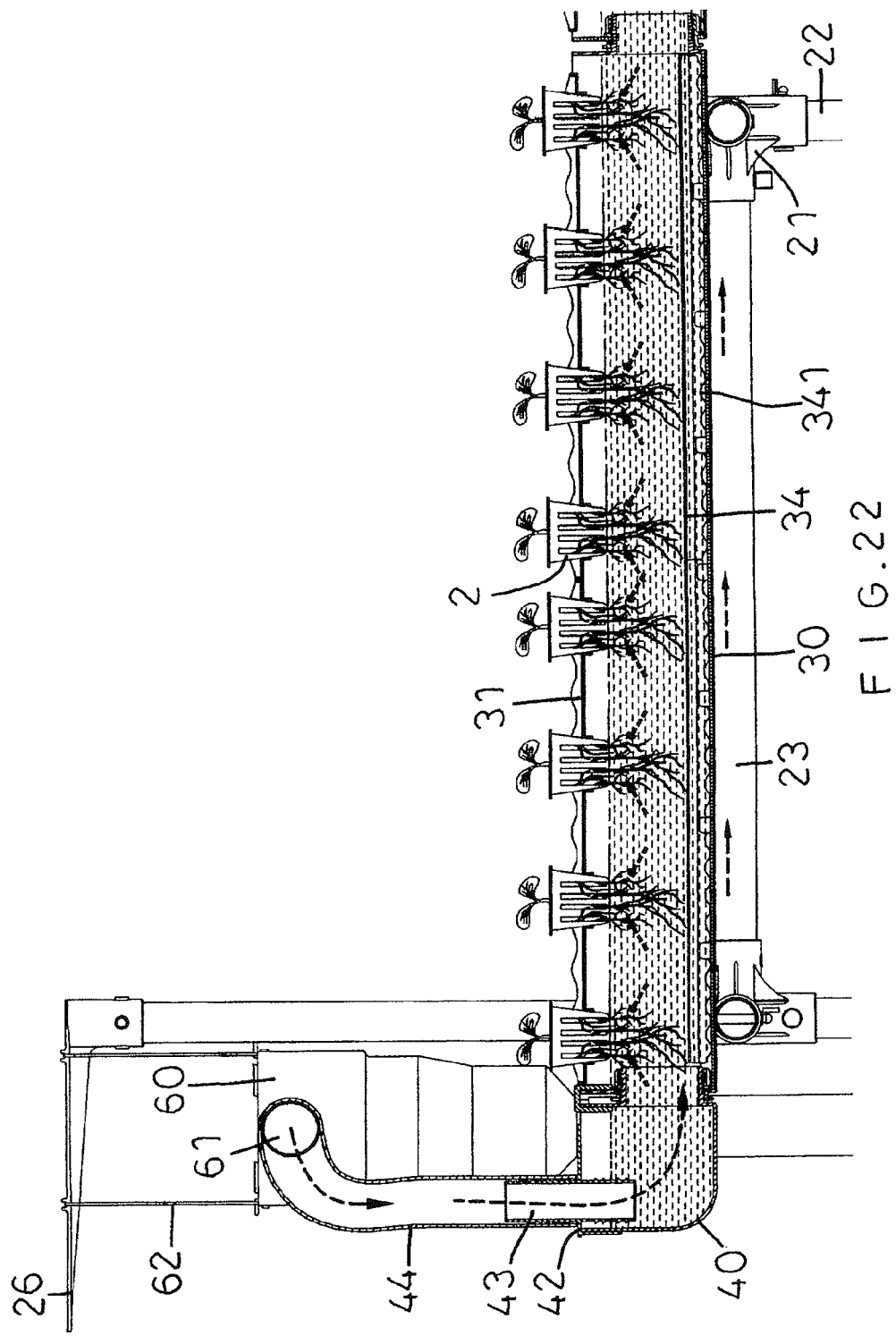
FIG. 22 is a partially front view of the aquaponic system for smaller plant baskets.

A plurality of caps 31 are mounted on the cultivating tanks 30, the inlet tanks 40 and the outlet tanks 50. Each of the caps 31 is provided with a plurality of large holes 32 for mounting larger plant baskets 1 (see FIG. 21) and a plurality of small holes 33 for mounting smaller plant baskets 2 (see FIG. 22).

Figure 13:
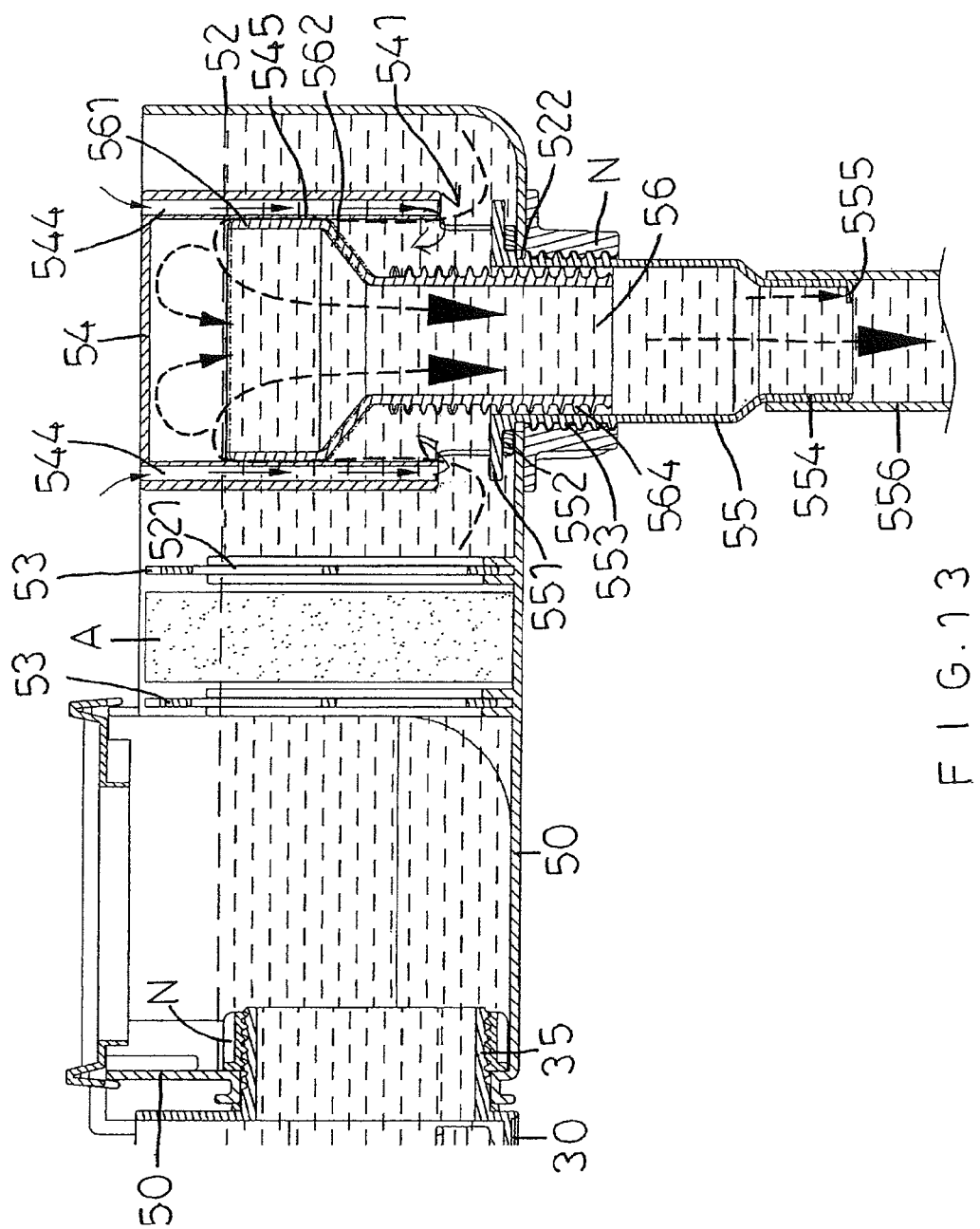
FIG. 13 is a schematic operational view of the aquaponic system as shown in FIG. 10 in use.
Figure 14:
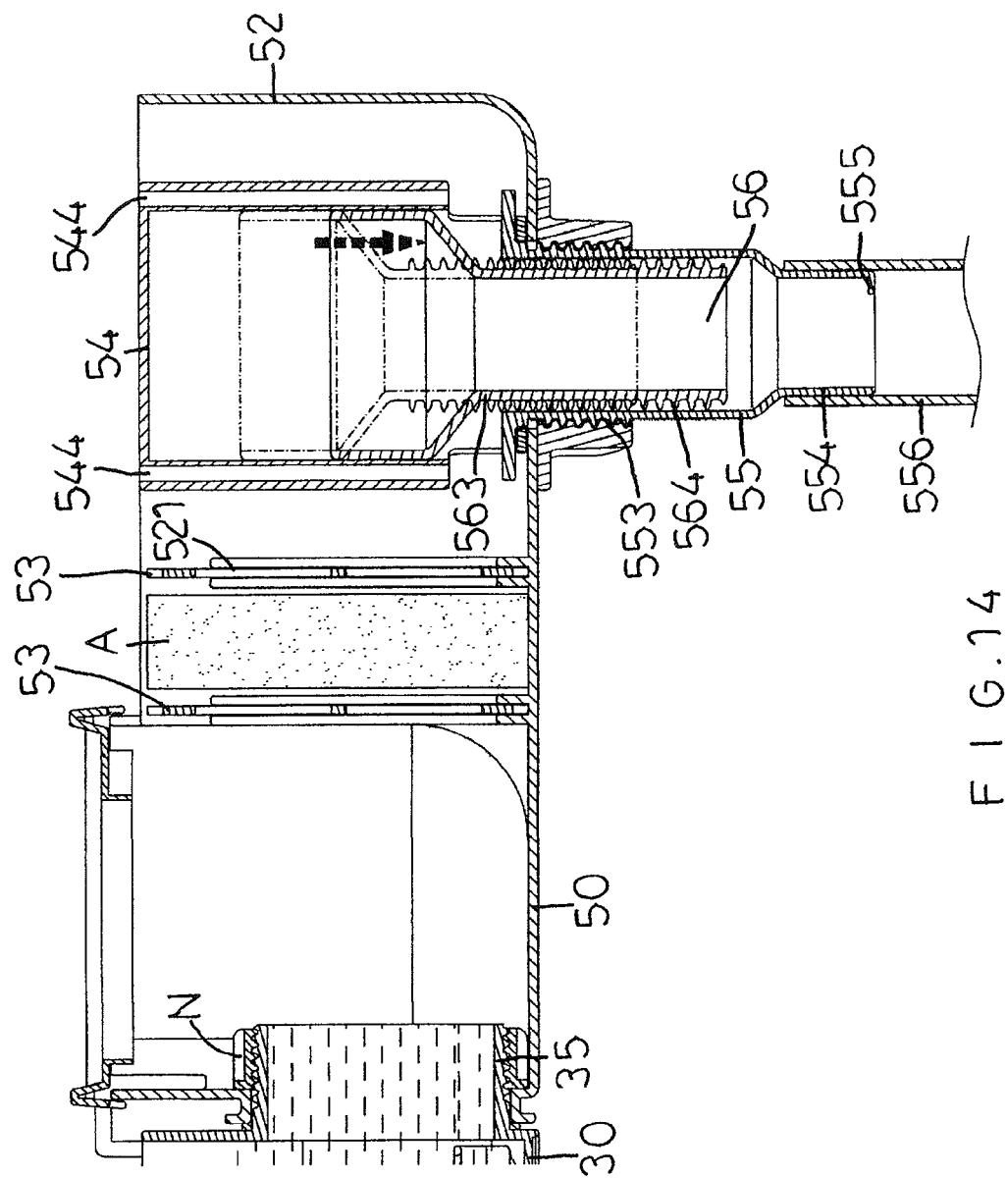
FIG. 14 is a schematic operational view of the aquaponic system as shown in FIG. 10, showing adjustment of the siphon.

As best shown in FIGS. 7-14, each of the outlet tanks 50 is provided with a water outlet seat 52 which is provided with two retaining groves 521, two hollow clamping plates 53 (see FIG. 7) are mounted in the two retaining groves 521 as shown in FIG. 14, and a filtering sponge "A" (see FIG. 7) is clamped between the two clamping plates 53. The water outlet seat 52 of each of the outlet tanks 50 has a bottom provided with a water outlet hole 522, and a housing 54 is received in the water outlet seat 52 and located above the water outlet hole 522. The housing 54 has a bottom provided with a plurality of passages 541 allowing entrance of the water and a plurality of wings 542 arranged between the passages 541. Each of the wings 542 is provided with a positioning portion 543. The housing 54 has a closed top face provided with a plurality of channels 544 extending through the housing 54 and connected to the passages 541, and ambient air passes through the channels 544 into the water outlet seat 52 as shown in FIG. 13. A water outlet tube 55 extends through the water outlet hole 522 of each of the outlet tanks 50. The water outlet tube 55 is provided with an outer thread 553, and a nut "N" is screwed onto the outer thread 553 of the water outlet tube 55. The water outlet tube 55 has an upper end provided with an enlarged stop edge 551 abutting the positioning portion 543 of each of the wings 542 of the housing 54, and an O-ring 552 is mounted on the water outlet tube 55 and located between the stop edge 551 and the bottom of the water outlet seat 52. The water outlet tube 55 has a lower end provided with a reduced pipe joint 554 connected with a water drain pipe 556 which is connected with the water intake port 43 of the water inlet seat 42 of a lower one of the inlet tanks 40. The water drain pipe 556 of the lowermost one of the outlet tanks 50 is connected to the aquarium 10 as shown in FIG. 16. The pipe joint 554 has an inner wall provided with a projection 555 that produces a vacuum pulling force to form a turbulent flow. The projection 555 protrudes inward and has area that is one third of a cross-sectional area of the pipe joint 554, to reduce the water outlet area of the pipe joint 554. A siphon 56 is mounted in the housing 54 and inserted into the water outlet tube 55. The siphon 56 has an upper end provided with a water entrance 561 which has an outer diameter smaller than an inner diameter of the housing 54, and a water intake space 545 (see FIG. 13) is defined between the water entrance 561 and the housing 54. The water entrance 561 has a lower end provided with a reduced conic portion 562 which has a lower end provided with a water outlet line 563 which has a periphery provided with a plurality of positioning teeth 564 engaging and positioned in an inner wall of the water outlet tube 55 by a friction between the positioning teeth 564 and the inner wall of the water outlet tube 55. The positioning teeth 564 are moved upward or downward in the water outlet tube 55 to adjust the position of the siphon 56.

It is appreciated that, the housing 54 has a closed top face, and the ambient air cannot enter the water outlet seat 52 from the housing 54, so that the water will always flow downward due to the siphoning action. Thus, the top face of the housing 54 is provided with the channels 544, to allow the ambient air passing through the channels 544 into the water outlet seat 52, and to form a flow cut state, so that the pressure in the housing 54 is the same as that of the ambient environment, and the water will not always flow downward due to the siphoning action. In addition, the projection 555 reduces the water outlet area of the pipe joint 554, so that when the water flows through the projection 555, the flow rate is increased, to produce a vacuum pulling force that forms a turbulent flow as shown in FIG. 13.

Figure 15:
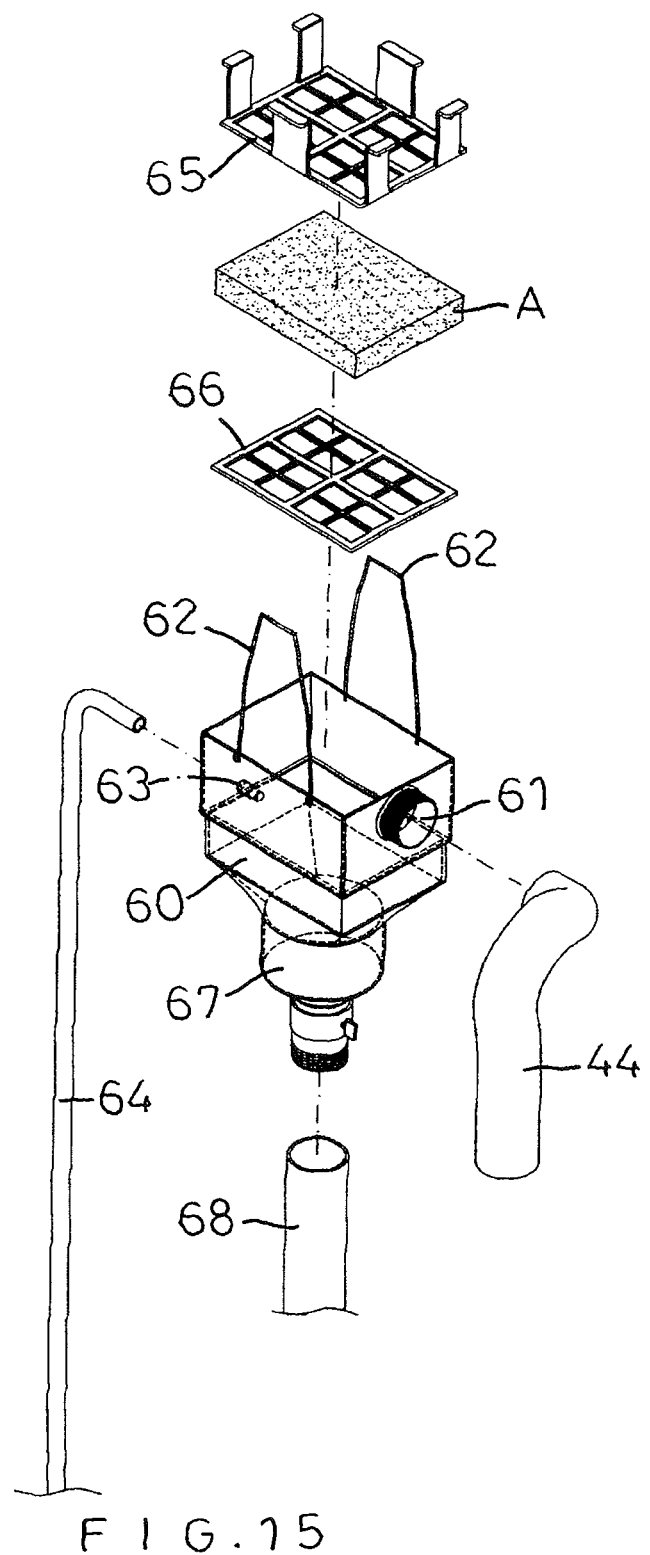
FIG. 15 is an exploded perspective view of a strainer unit of the aquaponic system as shown in FIG. 1.

As best shown in FIGS. 15 and 16, the strainer unit 60 is mounted on the frame 20 and includes a water outlet port 61 connected with the water inlet pipe 44, two hanging cords 62 suspended on one of the hanging brackets 26 of the frame 20, a water inlet port 63 connected with a water feeding pipe 64 which is connected with the motor 11 of the aquarium 10, two hollow clamping plates 65 and 66 located between the water outlet port 61 and the water inlet port 63, a filtering sponge "A" clamped between the two clamping plates 65 and 66, a fertilizer ferment chamber 67 located under the water inlet port 63, and a drain pipe 68 connected with the fertilizer ferment chamber 67. The water inlet port 63 is located at a position lower than that of the water outlet port 61.

Figure 17:
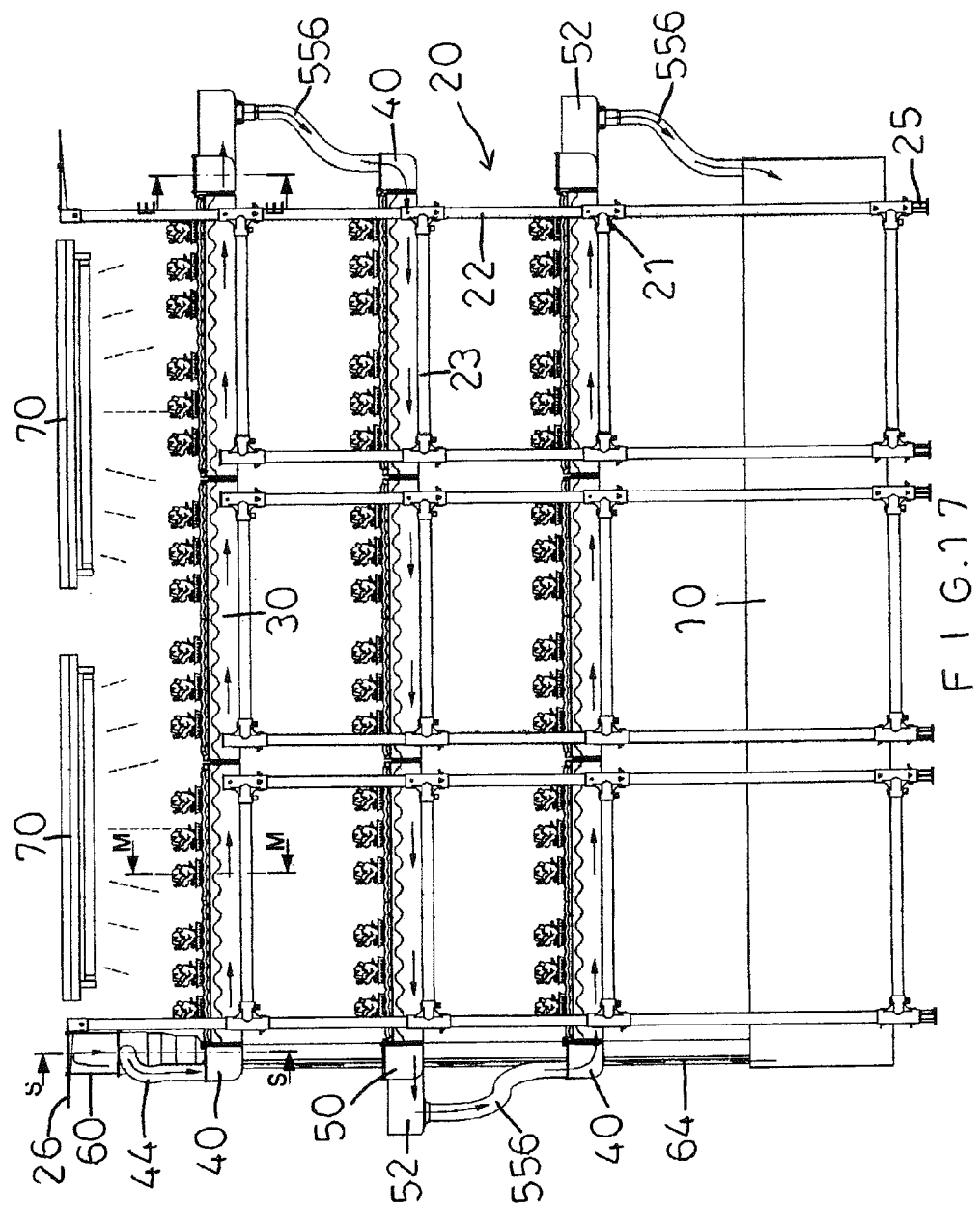
FIG. 17 is a schematic front operational view of the aquaponic system as shown in FIG. 1 in use.

As best shown in FIG. 17, the illuminating devices 70 are located above the cultivating tanks 30 to provide a light source for growth of the plant. Preferably, each of the illuminating devices 70 is a light emitting diode (LED).

Figure 23:
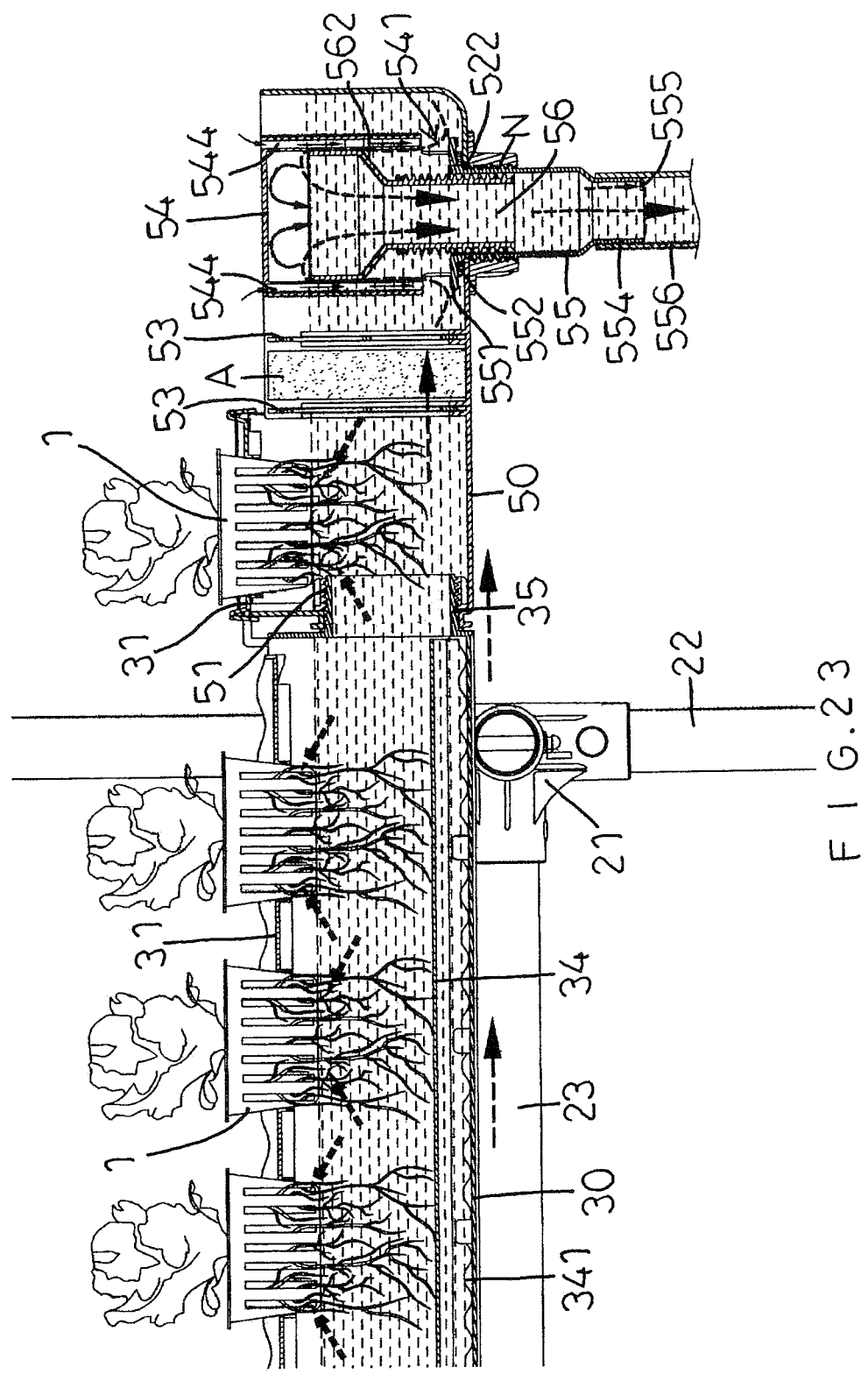
FIG. 23 is a partially front operational view of the aquaponic system as shown in FIG. 1 in use.
Figure 24:
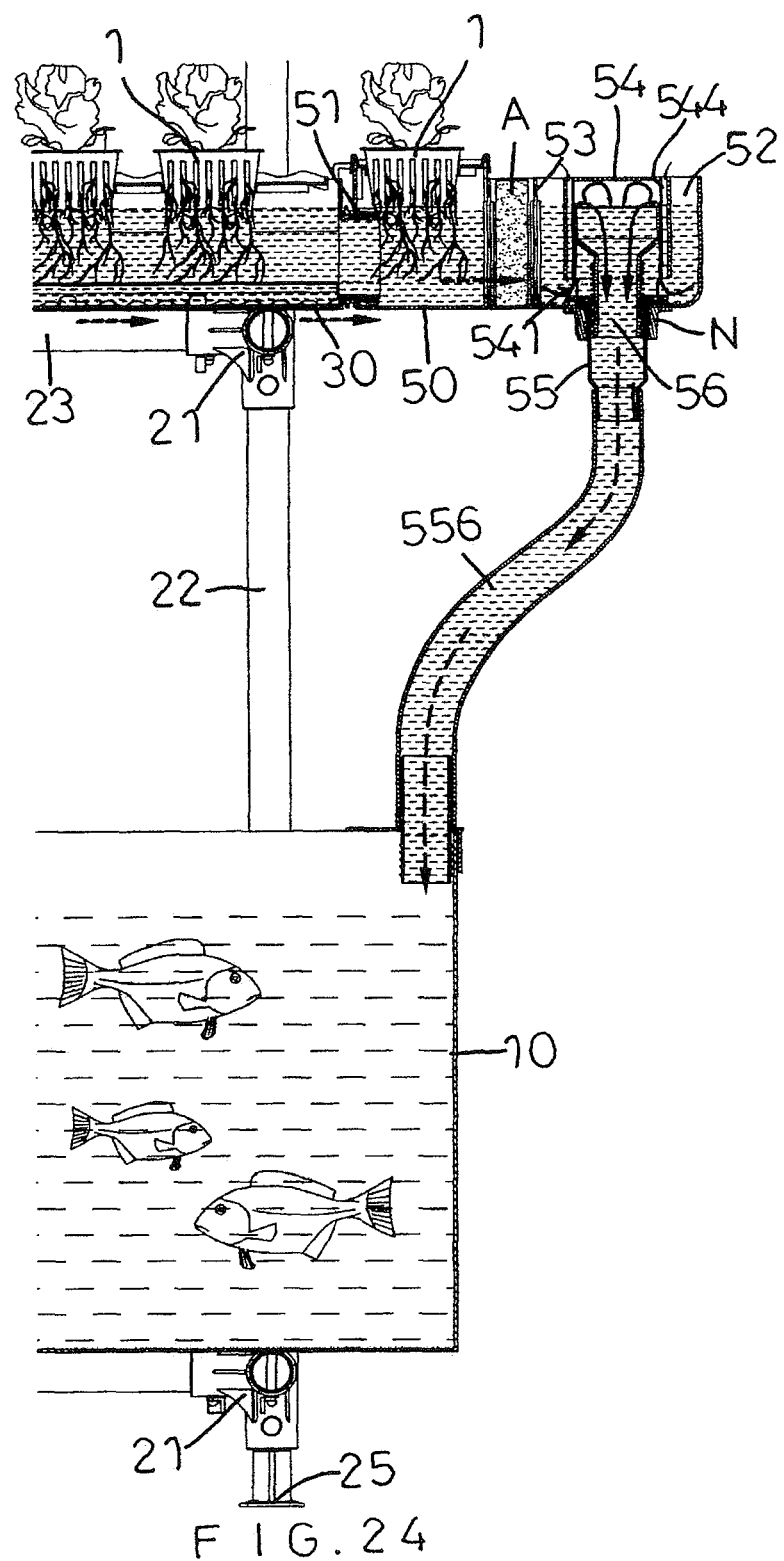
FIG. 24 is a partially front operational view of the aquaponic system as shown in FIG. 1 in use.

In operation, referring to FIGS. 16-24 with reference to FIGS. 1-15, when the dirty water of the aquarium 10 is extracted by the motor 11 and delivered through the water feeding pipe 64 into the strainer unit 60, the dirty water flows upward to pass through the filtering sponge "A" as shown in FIG. 19. At this time, the filtering sponge "A" strains the fish excrement, feedstuff remains and impurities contained in the dirty water, and the filtered water passes through the filtering sponge "A", the water outlet port 61, the water inlet pipe 44 and the water intake port 43 of the water inlet seat 42 into the uppermost one of the inlet tanks 40, and is delivered into the cultivating tanks 30. At the same time, the fish excrement and feedstuff remains attached to the bottom of the filtering sponge "A" are flushed by the water flow of the water feeding pipe 64 and are moved downward into the fertilizer ferment chamber 67, so that the fish excrement and feedstuff remains are fermented into a small molecular fertilizer which is lighter than the water. In such a manner, the small molecular fertilizer is pushed upward by the water flow to pass through the filtering sponge "A". Then, the small molecular fertilizer is carried by the clean water to pass through the water outlet port 61, the water inlet pipe 44 and the water intake port 43 of the water inlet seat 42 into the uppermost one of the inlet tanks 40, and is then delivered into and evenly distributed to the cultivating tanks 30, so that the small molecular fertilizer provides nutrient for growth of the plant in the cultivating tanks 30. Then, the water flows through the cultivating tanks 30 into the uppermost one of the outlet tanks 50. At this time, the filtering sponge "A" strains the impurities contained in the water. Then, the clean water flows through the passages 541 of the housing 54, then flows upward through the water intake space between the water entrance 561 and the housing 54, then flows downward into the siphon 56 as shown in FIG. 23, then flows through the water outlet tube 55 and the water drain pipe 556, and then flows through the water intake port 43 of the water inlet seat 42 into a lower one of the inlet tanks 40. In such a manner, the water flows through one of the inlet tanks 40, the cultivating tanks 30 and one of the outlet tanks 50 of an upper layer and then flows through one of the inlet tanks 40, the cultivating tanks 30 and one of the outlet tanks 50 of a lower layer, so that the water in turn flows through the inlet tanks 40, the cultivating tanks 30 and the outlet tanks 50 from top to down as shown in FIG. 16, and the small molecular fertilizer provides nutrient to the plant in the cultivating tanks 30 layer by layer. Finally, the filtering sponge "A" of the lowermost one of the outlet tanks 50 strains the impurities contained in the water, and the clean water flows through the water drain pipe 556 into the aquarium 10 as shown in FIG. 24. Thus, the water flows through all of the cultivating tanks 30 from top to down and layer by layer in a substantially S-shaped manner as shown in FIG. 17.

Accordingly, the fish excrement and feedstuff remains of the aquarium 10 are fermented into a small molecular fertilizer that is easily absorbed by the plant so as to promote the growth of the plant. In addition, the arcuate separation board 34 of each of the cultivating tanks 30 separates and prevents the root of the plant from blocking the water flow path 342. Further, the connecting holes 341 of the arcuate separation board 34 are arranged in a corrugated manner to allow circulation of the water, so that the fish excrement, feedstuff remains and impurities do not contact the root of the plant and will flow with the water conveniently, thereby preventing the root of the plant from being jammed or choked, such that the root of the plant absorbs the air and nutrient freely and is kept at a white color so as to grow healthily. Further, the positioning teeth 564 are moved in the water outlet tube 55 to adjust the height of the siphon 56, and to control the water level when overflow happens, so as to correspond to different water levels required by different roots of the plant. Further, the siphon 56 produces a vacuum pulling force without needing a bent tube, so that the water drain pipe 556 may be made into a straight pipe, thereby saving the material and space. Further, the frame 20 is shortened or expanded according to the practical requirement, so that the aquaponic system is available for places of different sizes.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An aquaponic system comprising:
a frame;
an aquarium located at a lower portion of the frame and having an interior provided with a motor;
a plurality of cultivating tanks arranged on the frame and having two opposite sides provided with a plurality of inlet tanks and a plurality of outlet tanks; and
a strainer unit mounted on the frame;
wherein:
each of the inlet tanks is provided with a water inlet seat;
the water inlet seat of the uppermost one of the inlet tanks is connected with a water inlet pipe;
each of the outlet tanks is connected with a lower one of the inlet tanks;
each of the outlet tanks is provided with a water outlet seat which is provided with a water outlet tube;
the water outlet tube of the lowermost one of the outlet tanks is connected to the aquarium;

the strainer unit includes:
a water outlet port connected with the water inlet pipe;
a water inlet port connected with a water feeding pipe which is connected with the motor of the aquarium;
two hollow clamping plates located between the water outlet port and the water inlet port;
a filtering sponge clamped between the two clamping plates;
a fertilizer ferment chamber located under the water inlet port; and
a drain pipe connected with the fertilizer ferment chamber; and
the water inlet port is located at a position lower than that of the water outlet port.

2. The aquaponic system of claim 1, wherein:
the frame includes a plurality of connectors, a plurality of upright tubes, a plurality of transverse tubes, a plurality of adjusting tubes, a plurality of stands, a plurality of pins and a plurality of fasteners;
each of the connectors allows insertion of two of the upright tubes;
each of the connectors is provided with two mounting sleeves allowing insertion of two of the transverse tubes;
the lowermost one of the connectors has a lower end connected with one of the adjusting tubes;
each of the adjusting tubes has a lower end provided with an external thread;
each of the stands has an upper end provided with an internal thread screwed onto the external thread of one of the adjusting tubes;
each of the connectors, each of the mounting sleeves, each of the upright tubes, each of the transverse tubes and each of the adjusting tubes is provided with an aperture allowing insertion of the pins and fastened by the fasteners;
each of the pins is provided with an annular groove; and
each of the fasteners is provided with a C-shaped snap ring retained in the annular groove of one of the pins.

3. The aquaponic system of claim 1, wherein a plurality of inverted U-shaped securing plates are located between the cultivating tanks, the inlet tanks and the outlet tanks to connect and secure the cultivating tanks, the inlet tanks and the outlet tanks.

4. The aquaponic system of claim 1, wherein:
the water inlet seat of each of the inlet tanks has a water intake port;
the water intake port of the uppermost one of the inlet tanks is connected with the water inlet pipe; and
the water outlet tube of each of the outlet tanks is connected to the water intake port of the water inlet seat of a lower one of the inlet tanks.

5. The aquaponic system of claim 1, wherein:
each of the cultivating tanks has a first end provided with a hollow external thread and a second end provided with a through hole;
the hollow external thread of one of the cultivating tanks extends through the through hole of another one of the cultivating tanks, and a nut is screwed onto the hollow external thread, so that the cultivating tanks are connected serially;
each of the inlet tanks is provided with a plurality of hollow external threads each of which extends through the through hole of one of the cultivating tanks, and a nut is screwed onto the hollow external thread, so that the cultivating tanks and the inlet tanks are combined together; and each of the outlet tanks is provided with a plurality of through holes, the hollow external thread of each of the cultivating tanks extends through one of the through holes of one of the cultivating tanks, and a nut is screwed onto the hollow external thread, so that the cultivating tanks and the outlet tanks are combined together.

6. The aquaponic system of claim 1, wherein the frame includes a plurality of hanging brackets.

7. The aquaponic system of claim 1, further comprising:
a plurality of illuminating devices located above the cultivating tanks.

8. The aquaponic system of claim 1, wherein:
two hollow clamping plates are mounted in the water outlet seat of each of the outlet tanks, and a filtering sponge is clamped between the two clamping plates;
the water outlet seat of each of the outlet tanks has a bottom provided with a water outlet hole, and a housing is received in the water outlet seat and located above the water outlet hole;
the housing has a bottom provided with a plurality of passages and a plurality of wings arranged between the passages;
the housing has a closed top face provided with a plurality of channels extending through the housing and connected to the passages, and ambient air passes through the channels into the water outlet seat;
the water outlet tube extends through the water outlet hole of each of the outlet tanks;
the water outlet tube is provided with an outer thread, and a nut is screwed onto the outer thread of the water outlet tube;
the water outlet tube has an upper end provided with an enlarged stop edge, and an O-ring is mounted on the water outlet tube and located between the stop edge and the bottom of the water outlet seat;
the water outlet tube has a lower end provided with a reduced pipe joint connected with a water drain pipe which is connected with the water intake port of the water inlet seat of a lower one of the inlet tanks;
the pipe joint has an inner wall provided with a projection;
a siphon is mounted in the housing and inserted into the water outlet tube;
the siphon has an upper end provided with a water entrance which has an outer diameter smaller than an inner diameter of the housing, and a water intake space is defined between the water entrance and the housing; and
the water entrance has a lower end provided with a reduced conic portion which has a lower end provided with a water outlet line.

9. The aquaponic system of claim 8, wherein the water outlet line has a periphery provided with a plurality of positioning teeth positioned in an inner wall of the water outlet tube, and the positioning teeth are moved upward or downward in the water outlet tube.

10. The aquaponic system of claim 8, wherein each of the wings is provided with a positioning portion, and the stop edge of the water outlet tube abuts the positioning portion of each of the wings of the housing.

11. The aquaponic system of claim 8, wherein the projection protrudes inward and has area that is one third of a cross-sectional area of the pipe joint.

12. An aquaponic system comprising:
a frame;
an aquarium located at a lower portion of the frame and having an interior provided with a motor; and a plurality of cultivating tanks arranged on the frame and having two opposite sides provided with a plurality of inlet tanks and a plurality of outlet tanks;

wherein:

each of the outlet tanks is connected with a lower one of the inlet tanks;

each of the cultivating tanks has a first end provided with a hollow external thread and a second end provided with a through hole;

the hollow external thread of one of the cultivating tanks extends through the through hole of another one of the cultivating tanks, and a nut is screwed onto the hollow external thread, so that the cultivating tanks are connected serially;

each of the inlet tanks is provided with a plurality of hollow external threads each of which extends through the through hole of one of the cultivating tanks, and a nut is screwed onto the hollow external thread, so that the cultivating tanks and the inlet tanks are combined together;

each of the outlet tanks is provided with a plurality of through holes, the hollow external thread of each of the cultivating tanks extends through one of the through holes of one of the cultivating tanks, and a nut is screwed onto the hollow external thread, so that the cultivating tanks and the outlet tanks are combined together;

a plurality of caps are mounted on the cultivating tanks, the inlet tanks and the outlet tanks; and each of the caps is provided with a plurality of large holes and a plurality of small holes.

13. An aquaponic system comprising:

a frame;

an aquarium located at a lower portion of the frame and having an interior provided with a motor; and a plurality of cultivating tanks arranged on the frame and having two opposite sides provided with a plurality of inlet tanks and a plurality of outlet tanks;

wherein:

each of the outlet tanks is connected with a lower one of the inlet tanks;

each of the cultivating tanks has a bottom provided with an arcuate separation board; and the arcuate separation board has two sides provided with a plurality of connecting holes which are arranged in a corrugated manner.

\* \* \* \* \*